INVENTOR.
Donald F. Alexander
BY
Frederick W. Ritchie
HIS ATTORNEY

INVENTOR.
Donald F. Alexander
BY
Frederick M Ritchie
HIS ATTORNEY

United States Patent Office 3,353,004
Patented Nov. 14, 1967

3,353,004
DOMESTIC ELECTRIC APPLIANCE
Donald F. Alexander, Dayton, Ohio, assignor to General Motors Corporation, Detroit, Mich., a corporation of Delaware
Filed Oct. 9, 1964, Ser. No. 402,803
18 Claims. (Cl. 219—398)

ABSTRACT OF THE DISCLOSURE

An oven control for low temperature roasting including a first temperature controller settable first to a high temperature setting, a motor for driving the first temperature controller to a low temperature setting, a timer for controlling the motor, and a user operated temperature adjuster for varying the low temperature setting.

This invention relates to a domestic appliance and more particularly to an improved electrical thermostatic control system for an oven.

Automatic oven control systems in the prior art have generally required a number of user operations in order to program the control to perform an automatic oven cooking operation. The result of such complex user presetting operations was to essentially negate the use of the automatic oven control. Many of these complex prior art arrangements require meat probes and provide for delayed start of the oven cooking operation with termination thereof at the desired serving time. Some have instant start with some form of holding cycle to keep the food warm after it is cooked. This invention, although operable also as a Cook and Warm system, is directed to an improved automatic oven control for a Brown and Tenderize operation which starts immediately and extends for a relatively brief predetermined timed browning period at a high temperature followed by an extended indefinite period at an accurately controllable, user settable low temperature for tenderizing the meat—a low temperature roasting control broadly taught in the patents to Schauer, Jr., 3,032,-636 and 3,093,722, issued May 1, 1962, and June 11, 1963, respectively.

Accordingly, it is a general object of this invention to provide an improved automatic oven control operable for effecting a presettable timed period of high temperature followed by an indefinite period of accurately controlled low temperature.

A more specific object of this invention is the provision of an automatic oven control for tenderizing meat and including means for providing a low temperature in said oven during said tenderizing operation, said means including a user variable temperature setting device for selecting a particular low temperature in accordance with the particular type and weight of meat being roasted.

A further object of this invention is the provision of a self-cleaning oven having a smoke eliminator and an automatic oven control system, said control system selectively providing either a high or low temperature oven COOK operation including Cook (high) and Warm (low) or Brown (high) and Tenderize (low) or an oven CLEAN operation and including means for negating the effectiveness of said smoke eliminator during the low temperature portions of an oven COOK operation.

A further provision of this invention is the combination of an oven with a smoke eliminator and including means for selectively activating said smoke eliminator in accordance with the operation occurring in said oven.

Another general object of this invention is the provision of a motorized control for an oven having a plurality of operating means therein and wherein said operating means are selectively energized by said motorized control.

A more specific object of this invention is the provision in an oven including a rotisserie of an automatic oven control system having means for controlling low temperatures in said oven for tenderizing meat, means for controlling high temperatures in said oven and means for operating said rotisserie, said automatic control including a motorized means for selectively operating said rotisserie operating means and said temperature control means.

Another object of this invention is the provision of an automatic heating means control system for an oven having COOK operations which include sequences of either high temperature cooking or low temperature tenderizing operations, said control system including means for providing closer control of said heating means during said low temperature tenderizing operation.

Another object of this invention is the provision of an automatic heating means control system for an oven having either high temperature or low temperature operations, said control system including means for reducing the heating rate of or the rate of power supply to said heating means to provide closer control of said heating means during said low temperature operations.

A still further object of this invention is the provision of improved means for calibrating the oven thermostat in an electrical temperature sensing system.

Further objects and advantages of the present invention will be apparent from the following description, reference being had to the accompanying drawings wherein a preferred embodiment of the present invention is clearly shown.

Range construction

Figure 1:
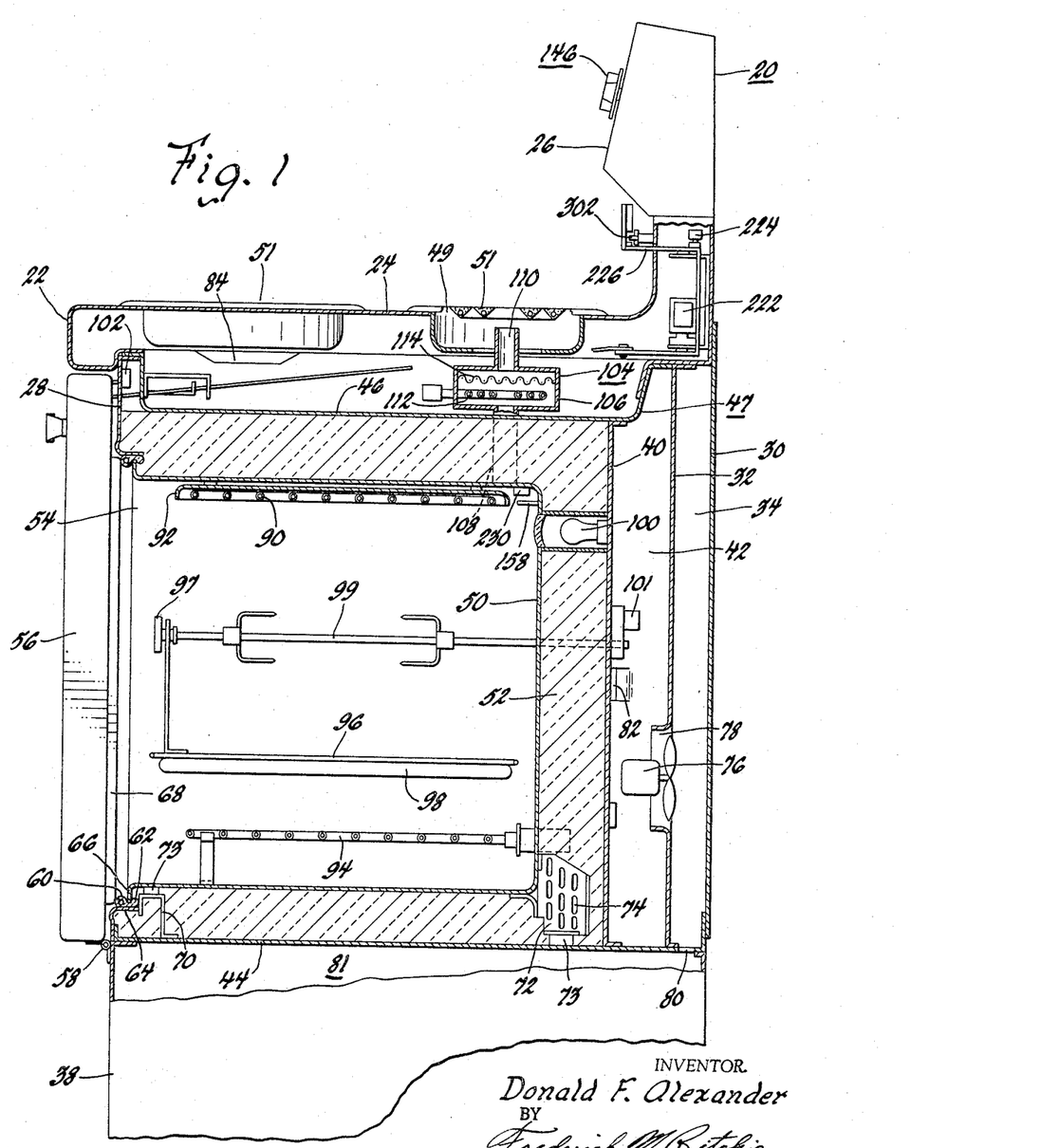
FIGURE 1 is a fragmentary side sectional view taken along line 1—1 in FIGURE 2 and with parts broken away to show an electric range suitable for use with this invention.
Figure 2:
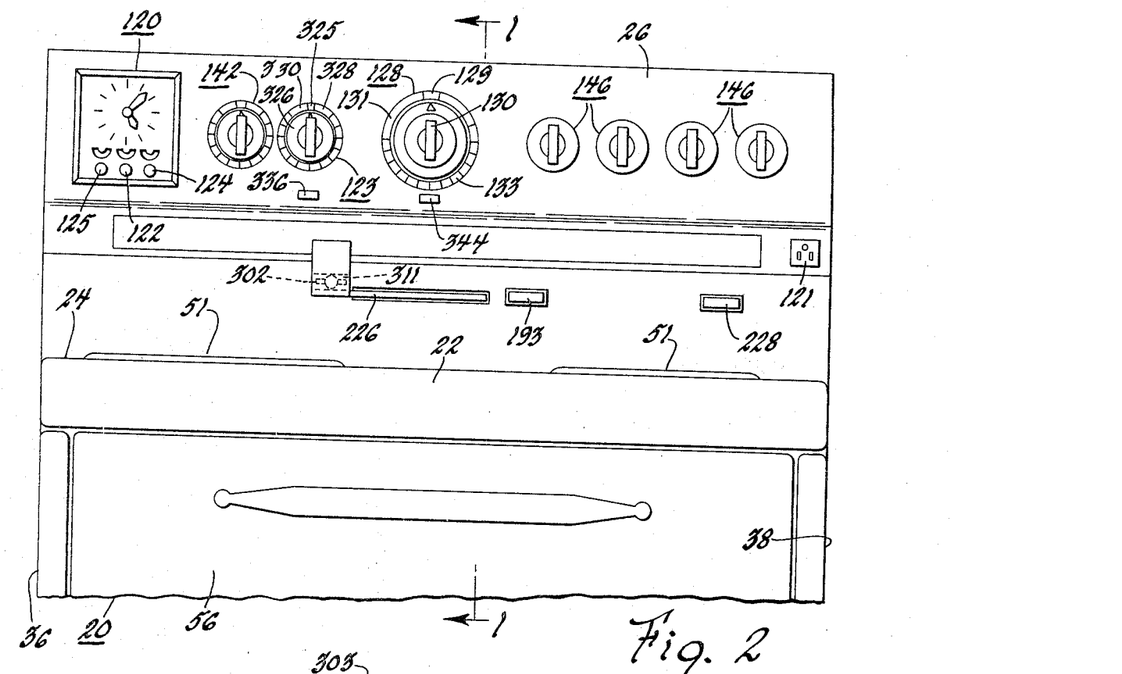
FIGURE 2 is a fragmentary front elevational view of the electric range in FIGURE 1.

Referring now to FIGURES 1 and 2 of the drawings, an electric range 20 suitable for use with the improved control arrangement of this invention is illustrated. More particularly, the range 20 is comprised of an upstanding substantially boxlike metal body 22 having a substantially horizontal metal cooking top 24 and an upstanding control console or backsplash 26 at the rear of the cooking top 24. The body 22 constitutes a shell or range casing and includes a front wall 28, an outer rear wall or electric wire cover 30, an inner rear wall 32 spaced forwardly of the rear wall 30 to form an inlet air passageway 34, and a pair of outer sidewalls 36, 38. Spaced inwardly from the rear wall 32 and the sidewalls 36, 38 are insulation retainer means comprised of a back retainer wall 40, side retainer walls, such as 42, on each side thereof and spaced inwardly from the range sidewalls 36, 38, a bottom wall or support partition 44 and a top wall 46 which is also the bottom of a pan-like subtop member 47 carried by the range casing 22 for forming a compartment beneath the cooking top 24.

An oven forming liner 50 having a one-coat acid resistant porcelain finish is positioned within the insulation retainer and spaced from the walls thereof to form a chamber for insulation 52 which completely envelops the oven liner 50 except for the front opening 54 thereof which is closable by an oven door 56 hingedly mounted at 58 for opening and closing the oven liner to gain access thereto. A fiberglas seal 60 completely circumscribes the opening 54 of the oven liner and includes an attachment portion 62 sandwiched between a flange 64 of the front wall 28 of the range casing and the flange 66 of the oven liner to minimize heat conduction therebetween. The front of the seal 60 abuts the plug-like inner panel portion 68 of the door 56 to seal the heat and other products of the heat cleaning process in the oven. The oven liner 50 is mounted at the bottom thereof on the support partition 44 by means on each side of the liner, such as brackets 70, 72, the rear ones of which include a plurality of slots 74 for minimizing heat conduction between the liner 50 and its support wall 44. Ceramic spacers 73 also serve to minimize heat flow.

Forced air cooling of the surfaces between the insulation retainer walls and the back, side and top walls of the range is provided by a blower means 76 disposed in an opening 78 of the inner rear wall 32, the blower operating to draw outside air into the range through the lower storage drawer compartment 81 and the opening 80 in the partition 44. The air thus drawn into the range is forced through lanced out openings 82 in each of the sidewalls insulation retainers 42—this air, after filling the space between the side insulation retainers 42 and the outer range walls 36, 38, entering the space beneath the cooking top 24 through openings, such as the notch 84, formed in the top edge of the subtop 47. The cooking unit openings 49 around the surface cooking units 51 provide the means for exhausting the cooling air from the range.

Heating within the oven linear 50 is provided by a broil heating element 90 carried in a reflector 92 at the top of the oven and by a bake heating element 94 at the bottom of the oven. Removable shelves, such as 96, are slidably positioned on embossments 98 on opposite sides of the oven liner. Illumination of the oven liner when the oven door 56 is opened is provided by a lamp 100 interconnected with a power supply through a door switch 102.

A rotisserie usable with this oven may comprise a spit 97 having a shaft 99 rotatably driven by a rotisserie motor 101—the insertion of the shaft in the motor serving generally to connect circuits in accordance with teachings of the patent to Allen, Jr., et al. 2,821,903, issued Feb. 4, 1958. More particularly, and with reference to FIGURE 6, the insertion of the spit 97 will open switches 103 and close switches 105.

To accommodate the smoke and products of combustion from an oven cleaning or cooking operation, a catalytic oxidizing unit 104 is positioned to receive the exhaust from the oven 50. More particularly, the catalytic oxidizing unit 104 is comprised of a housing 106 having an inlet duct 108 in communication with the oven 50 and an outlet duct 110 in communication with the atmosphere through one of the cooking unit openings 49. Between the ducts 108 and 110 is the chamber 106 enclosing a catalyst heater 112 and a catalyst screen 114. The heating element or catalyst heater 112 is energized to activate the catalyst screen 114 whenever it is desired to eliminate smoke and other noxious products issuing from the oven.

*Control means—General*

Figure 7:
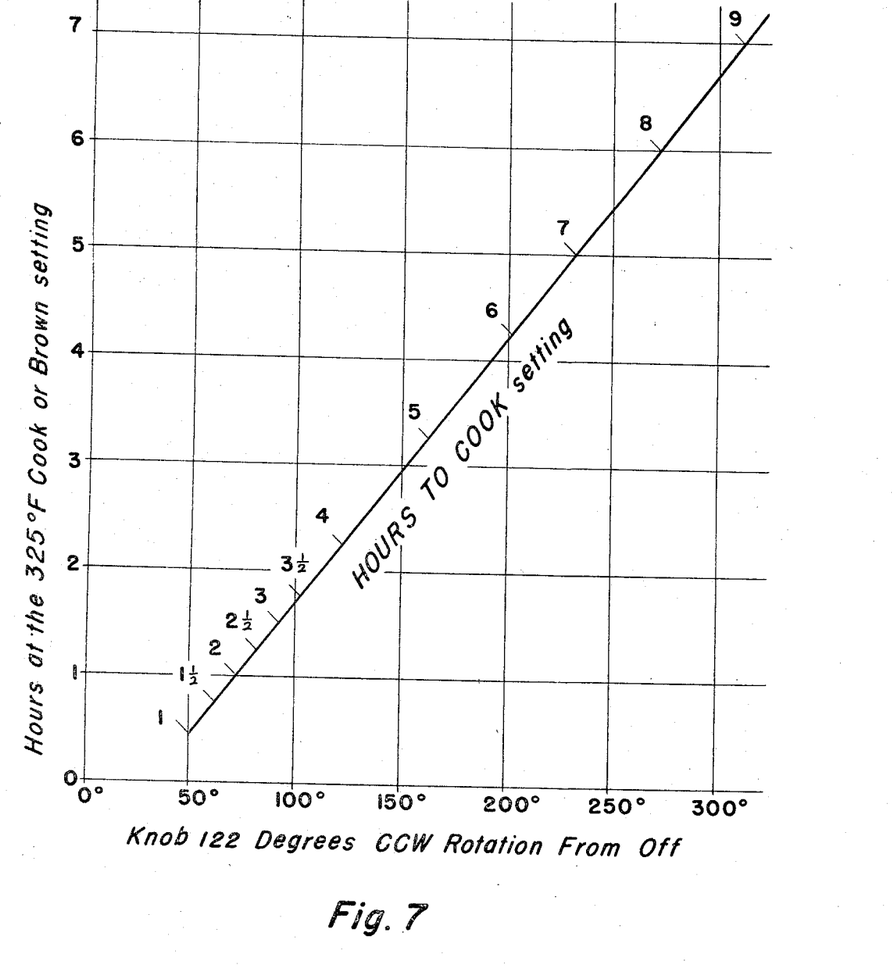
FIGURE 7 is a graph showing the correlation between an HOURS TO COOK setting and the duration of high temperatures in the oven.

User control means are provided for the various functions of the electric range 20. In FIGURE 2, the control panel 26 is shown with an electric clock timing means or automatic oven control 120 presettable from zero to nine hours, as by a knob 122, for HOURS TO COOK, thereby to regulate in a Cook and Warm operation the duration of high temperature oven cooking which immediately precedes a relatively lower serving temperature holding action of indefinite duration and substantially without further cooking (FIGURE 7).

The oven control 120 may also include a knob 124 presettable to a desired ON time for the auxiliary power outlet 121 and conditionable, as by depressing, for repeat operation without resetting of the ON time. It is conventional for oven controls, such as 120, to include a short interview timer settable by a knob 125 for the desired interval, say up to sixty minutes.

In accordance with a major concept of this invention, the HOURS TO COOK knob 122 is also used in a Brown and Tenderize or low temperature roasting operation of the type disclosed in the aforementioned Schauer patents. Knob 122 regulates the duration of a relatively short high temperature oven browning action which immediately precedes a relatively long low temperature tenderizing action of indefinite duration. In addition to the HOURS TO COOK knob 122, tenderizing requires the use of a tenderizing control 123 which is presettable for precisely predetermining the exact low temperature in the oven which is best suited for a given cut of meat.

Figure 6:
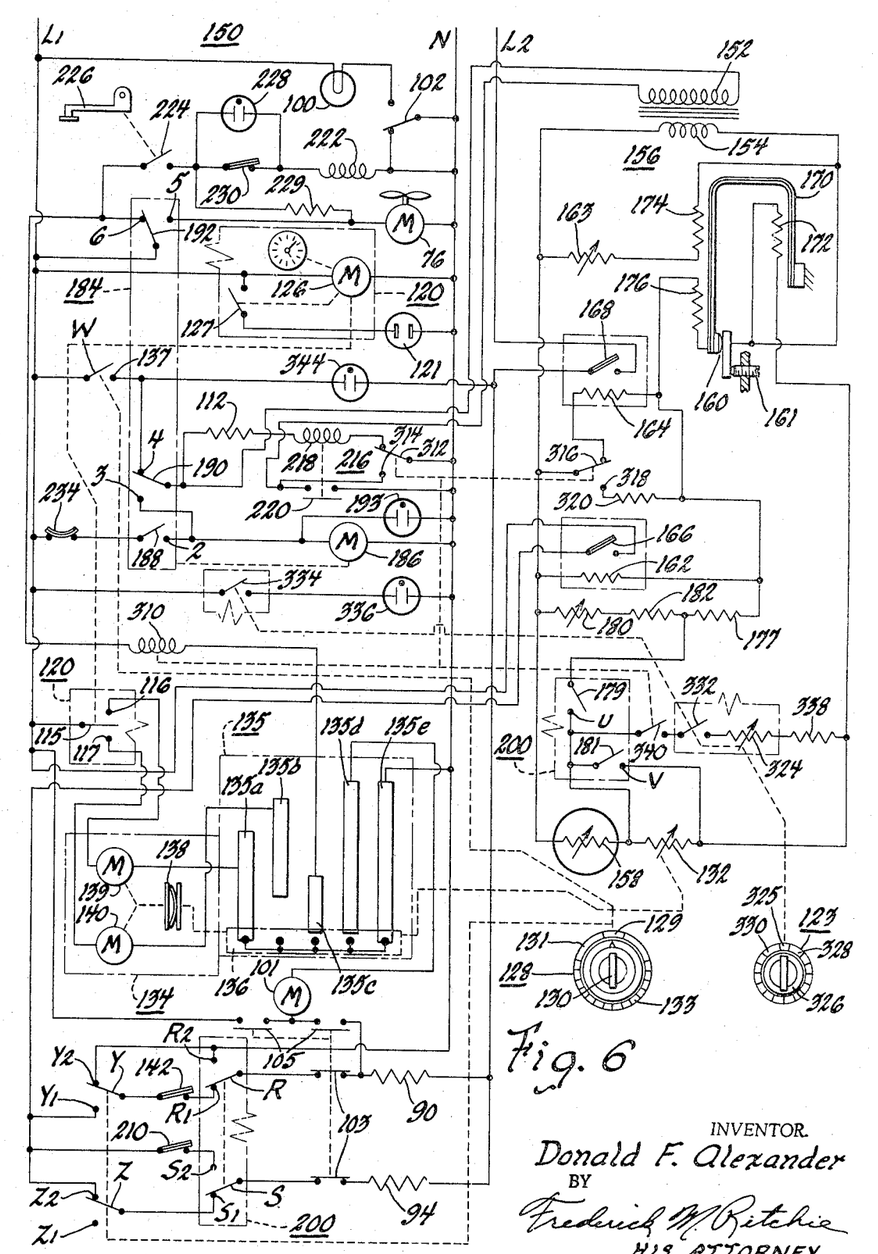
FIGURE 6 is a schematic wiring diagram embodying the control system of this invention.

More particularly, and with reference to the wiring diagram of FIGURE 6, the clock timing means 120 includes a clock motor 126 operably associated with a timer switch 127 for controlling the duration of power supply to the auxiliary outlet or plug-in appliance receptacle 121 in accordance with the manual setting of the user knob 124—the switch 127 having a closed position to supply power and an open position to terminate the supply of power. For use in both the Cook and Warm operation and the Brown and Tenderize operation, the clock timing means 120 includes a thermostat drive switch 115 which has a neutral position (as shown) when the HOURS TO COOK knob 122 is at zero, a position in engagement with a temperature up contact 116 when a given number of hours to cook is selected for driving the oven temperature up, and a position in engagement with a temperature down contact 117 for driving the oven temperature down. The switch 115 moves from contact 116 to 117 after a predetermined percentage of the time selected has elapsed. For instance, if the HOURS TO COOK knob 122 has been mvoed to select from zero to three hours, the switch 115 will move from the contact 116 to the contact 117 after fifty percent of the selected time has elapsed. The switch 115 will move from the contact 116 to the contact 117 after one and three-fourth hours have elapsed in a selected HOURS TO COOK period of from four to six hours. When an HOURS TO COOK selection of from seven to nine hours is made, the switch 115 will move from the contact 116 to the contact 117 after two hours.

Other controls for the range 20 include an oven cooking thermostat 128 having a user settable thermostat knob 130 positionable to an OFF position 129, a BROIL position 131 and a variable bake or warm temperature position 133. Manipulation of the knob 130 in the variable temperature position 133 will adjust a variable resistance or rheostat 132 in the wiring circuit in accordance with the temperature selected and position selector switches W, Y, and Z on the bake contacts 137, $Y_2$ and $Z_2$, respectively. With the knob 130 in the BROIL position 131, switches Y and Z are moved, respectively, to broil contacts $Y_1$, $Z_1$. W remains closed in all knob positions except OFF.

Although the oven thermostat 128 may be positioned manually to the desired oven temperature, both the automatic Cook and Warm operation and the Brown and Tenderize operation utilize a motorized thermostat to drive the oven temperature control rheostat 132 to high and low temperature positions which are factory predetermined, namely high (325° F.) and low (155° F.).

For the Brown and Tenderize operation the low temperature is adjustable from 155° F. to 215° F. for the desired tenderizing. For motorizing the thermostat and with reference again to FIGURE 6, a control motor and drive assembly 134 includes a printed circuit board 135 having a movable bus bar 136 driven along the tracks of the board, through a friction clutch 138, by an up motor 139 or a down motor 140. The bus bar 136 is also movable along the tracks 135a–e of the printed circuit board by a manual rotation of the user thermostat knob 130 which, at the same time, adjusts rheostat 132 to the selected temperature. The clutch 138 prevents the back driving of motors 139 and 140 when the thermostat knob 130 is turned manually.

The broiling operation of the range 20 may be regulated with an additional control 142 which includes an adjustable pulser in series with the broil heating element 90 whenever the user settable thermostat knob 130 is in the broil position. A variable doneness of the meat being broiled is effected by manipulating the control 142 in accordance with the teachings of the Fry Patents 2,790,056 and 2,828,399, issued Apr. 23, 1957, and Mar. 25, 1958, respectively.

The remaining controls 146 on the control panel 26 are devoted to controlling the four surface cooking units 51 on the cooking top 24, and, since this forms no part of the invention, neither the switches nor the cooking units are shown in the wiring diagram of FIGURE 6.

In general, the control means of this invention embodies a high voltage (118/236 volt) A.C. circuit 150 including the primary coil 152 of a transformer, the secondary coil 154 of which is in a low voltage (11 volt) A.C. circuit 156.

The low voltage circuit 156 includes a wound wire resistance sensor or resistive means 158 in series with the motorized or user settable oven thermostat rheostat 132. In accordance with the temperatures sensed at 158, a cycler or responder switch 160 opens and closes to pass current to a pair of thermal relays, and more particularly to the heaters 162, 164 therefor which control, respectively, a pair of relay switches 166, 168 in the high voltage circuit 150.

The cycler switch 160 may be comprised of a U-shaped bimetal, self-interrupting thermal relay means 170 having a responder heater 172 wrapped around one leg thereof and operative upon heating to cause the cycler switch to move in a closing direction. Wrapped on the other leg are a voltage compensator heater winding 174 and an anticipator heater 176 which operate upon heating to cause the cycler switch to move in an opening direction. Another resistance 177 in the low voltage circuit cooperates with the heater 176 to give a little more anticipation to the cycler by effecting a few more watts at the heater 176. For a more detailed explanation of a variable resistance temperature sensing system for an oven, reference may be had to the Baker Patent 2,962,575 issued Nov. 29, 1960, which is representative of such a temperature controller commercially available from the King-Seeley Thermos Co. As taught in the Baker patent, calibration of the switch 160 may be accomplished mechanically at the switch as by set screw 161.

In accordance with another aspect of this invention, a remote electrical calibration adjustment is provided, in addition to the mechanical adjustment 161, which is often hidden by the range construction and not easily accessible for service adjustment. With an 11-volt secondary coil 154, the voltage compensation heater 174 is designed to provide sufficient heat inside the cycler switch for proper voltage compensation, but of a lower resistance value than would be normally required so that a portion of the circuit can be completed outside the switch through a rheostat 163. The rheostat 163 can then be placed on an outside surface of the range or other readily accessible service location and adjusted to calibrate the oven temperature plus or minus 30° F. at the bake temperature (325° F., for example, although the entire range of temperatures is available for the bake temperature depending on the initial adjustment at 161). This is of particular value in ranges which lack the extra insulation normally used when the range has the high temperature cleaning feature. By way of example, the resistance value of the rheostat 163 should be 5–10% of the resistance value of heater 174.

*Control means—Cleaning*

We turn now to the control arrangement for a self-cleaning oven and more particularly to the parts relating thereto shown in the schematic wiring diagram of FIGURE 6. Accumulated oven soil must be degraded at a temperature of 750° F. or more to effect a high temperature cleaning process consisting of partial oxidation of the soil in the oven with a restricted air supply.

The general process of heating to a high temperature for burning off oven soil has been taught in copending application Ser. No. 391,559, filed Aug. 24, 1964, and assigned to the same assignee as this invention. This invention teaches an improved control system or arrangement for such a self-cleaning oven which includes provisions for separate automatic operations of Cook and Warm and Brown and Tenderize. It is, of course, within the purview of this invention to utilize these improved cooking control systems on ranges which are not provided with the self-cleaning feature.

Turning now to those components related to the oven cleaning cycle and the control arrangement therefor, a second or cleaning temperature control rheostat 180 is brought into the circuit with respect to the senser 158 when the oven is being cleaned—the user settable cooking temperature control rheostat 132 being made ineffective during cleaning as by shunting or disconnecting thereof. The rheostat 180 is factory adjustable to provide an oven temperature range of 850° F. to 950° F. and is preset during the manufacture of the range to provide an oven cleaning temperature of 880° F. As a safety precaution, a fixed resistance 182 is added to prevent an adjustment of the rheostat 180 for temperatures above 950° F.

To initiate a cleaning cycle and to shift the temperature sensing system for providing the higher cleaning temperature of 880° F., a cleaning temperature control contact U is closed by a cleaning temperature control switch 179 to bring the second temperature control rheostat 180 into controlling relationship with the senser 158, the senser being of a type having a large positive temperature coefficient of resistance such as nickel wire. At the same time, a shunt contact V is closed by a cooking temperature shunt switch 181 to shunt the first temperature control rheostat 132 completely out of the cleaning circuit. Since the rheostat 132 is operated by the conventional user settable thermostat knob 130, it can be seen that a user selected position of the oven thermostat 128 during a cleaning cycle has absolutely no effect on the regulation of cleaning temperatures.

Figures 4, 5:
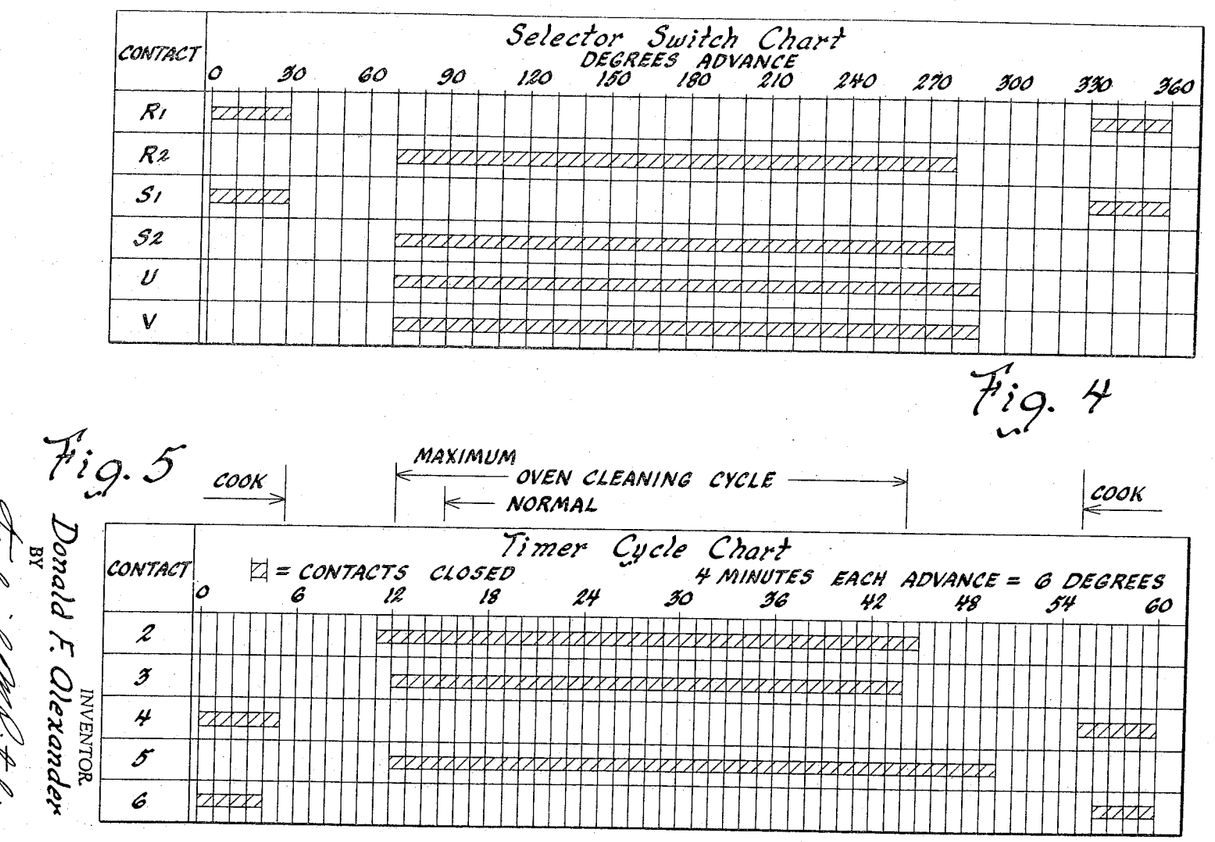
FIGURE 4 is a selector switch chart illustrating the positioning of internal switches in an electrical switch assembly used with the control arrangement of this invention.
FIGURE 5 is a timer cycle chart illustrating the positioning of internal switches in an oven timer used with the control arrangement of this invention for providing either an oven cleaning or an oven cooking operation.

A clean timer 184 is comprised of a clean timer motor 186 for operating three cam actuated switches 188, 190 and 192. The clean timer motor switch 188 has an open position at all times except during a cleaning cycle, at which time the switch closes on a clean timer motor contact 2, a neon cleaning cycle ON lamp 193 indicating the operation of the cleaning cycle. The clean timer switch 190 moves between a cleaning cycle contact 3 and a cooking cycle contact 4; and the clean timer switch 192 moves between a cleaning cycle contact 5 and a cooking cycle contact 6. For more detailed information on the positioning of the timer switches 188, 190 and 192 at any given point in the 360° rotation of the timer, reference may be had to the timer cycle chart of FIGURE 5.

Cooperating with the clean timer 184 is the selector switch assembly 200 including heating element transfer switches R and S in the high voltage circuit and the cleaning temperature control switch 179 and cooking temperature shunt switch 181 in the low voltage circuit. Interconnected transfer switches R and S connect the broil heating element 90 and the bake heating element 94 in a particular manner to the source of power $L_1$, N and $L_2$ depending on whether a COOK operation ("broil" or "bake," contacts $R_1$, $S_1$ closed) or a CLEAN cycle (contacts $R_2$, $S_2$ closed) is to be effected. More particularly and with the user settable knob 130 in the variable temperature "bake" position 133 (swich Y on contact $Y_2$ and swich Z on contact $Z_2$), switch R on contact $R_1$ connects the broil unit 90 through the oven thermostat switch Y across $L_2$N to 118-volt power and switch S on contact $S_1$ connects the bake unit 94 across $L_1$, $L_2$ to 236-volt power to provide heat energy for the baking function of the COOK operation thermally cycled at 166, 168. For example, 3800 watts of heat energy are provided during the "bake" function comprising 3000 watts from the bake unit 94 and 800 watts from the broil unit 90.

With the user settable knob 130 on "broil" position 131 (switch Y on contact $Y_1$ and switch Z on contact $Z_1$), the bake unit 94 is deenergized and switch R on contact $R_1$ connects the broil unit 90 through the oven thermostat switch Y across $L_1$, $L_2$ to 236-volt power to provide heat energy for the broiling function of the COOK operation thermally cycled at 166, 168. During broiling, as aforesaid, the supply of heat energy is further controlled by the pulser 142. Specifically, 3200 watts of heat energy maximum are provided during the "broil" function, all from the broil unit 90 since the bake unit is disconnected at $Z_1$.

For the CLEAN operation, and irrespective of the position of the user settable oven thermostat knob 130, the selector switch assembly 200 is manually operated to position transfer switches R and S on contacts $R_2$ and $S_2$, respectively, and to close cleaning temperature control switch 179 and cooking temperature shunt switch 181. Optionally, rheostat 132 could just as well be made ineffective by disconnecting it at either end thereof when switch 181 closes. Thus, the broil unit is connected directly across $L_2$, N to 118-volt power cycled by the thermal relay switch 168. At the same time the bake unit 94 is connected through a pulser 210 across $L_1$, $L_2$ to 236-volt power cycled on both sides of the line by thermal relay switches 166, 168. With the pulser 210 adjusted for 43% ON time heat energy is thus supplied by broil and bake units to the oven for elevating the temperatures of the oven walls sufficiently to burn off the accumulated oven soil, i.e., to approximately 880° F.

Temperatures in the CLEAN operation are considerably above those used during a COOK operation. For this reason a number of safety devices are incorporated in the control arrangement of this invention.

Since the degradation of accumulated oven soil is accomplished by the evolution of considerable smoke, the operation of the catalyst 114 may be assured before the oven is conditioned for high temperatures. In this regard (FIGURE 6), a relay 216 includes a solenoid coil 218 in series with the catalyst heater 112 and a switch 220 in series with the power supply and the primary 152 of the transformer. Thus, the low voltage circuit 156 cannot be energized for producing high oven cleaning temperatures until the catalyst heater 112 and solenoid coil 218 are energized.

Before the initiation of an oven cleaning cycle, the oven door 56 is latched closed and the latch mechanism itself is locked in an immobilized condition. For freeing and locking the latching mechanism, the high voltage circuit 150 includes a latch solenoid 222 in series with a latch solenoid switch 224 and the door switch 102. In general, the switch 224 is actuated by the movement of the door latch handle 226. The latch mechanism for accomplishing this is described more fully in the aforementioned copending application Ser. No. 391,559.

Once the oven door is locked shut, it is desirable that the oven door not be openable until the temperatures within the oven return to a safe level. For this purpose a thermally responsive switch 230 is included in series with the lock solenoid—the switch 230 having an open position at all temperatures over 500° F. to prevent the door from being unlatched. During the period of high temperature in the oven, a neon lock lamp 228, energized during CLEAN through a bleeder resistor 229, gives a visible indication that the oven door is locked shut and cannot be opened.

Also in view of the high temperatures available within the oven liner 50 during a CLEAN operation, it is desirable that the blower 76 be energized to cool the sidewalls of the range. To assure that the blower is in operation before a cleaning cycle can be commenced, a fan safety thermostat 234, responsive to heated air in the blower plenum, is included in series with the timer motor switch 188. When the blower or fan 76 is operating and normal air flow results, the switch 234 will be closed and when insufficient air flow results from any cause, the switch will be opened to prevent energization of the primary coil 152 of the transformer which energizes the low voltage circuit. Unless the transformer is energized, the temperature sensing system is inoperative to provide a supply of heat to the oven.

Figure 3:
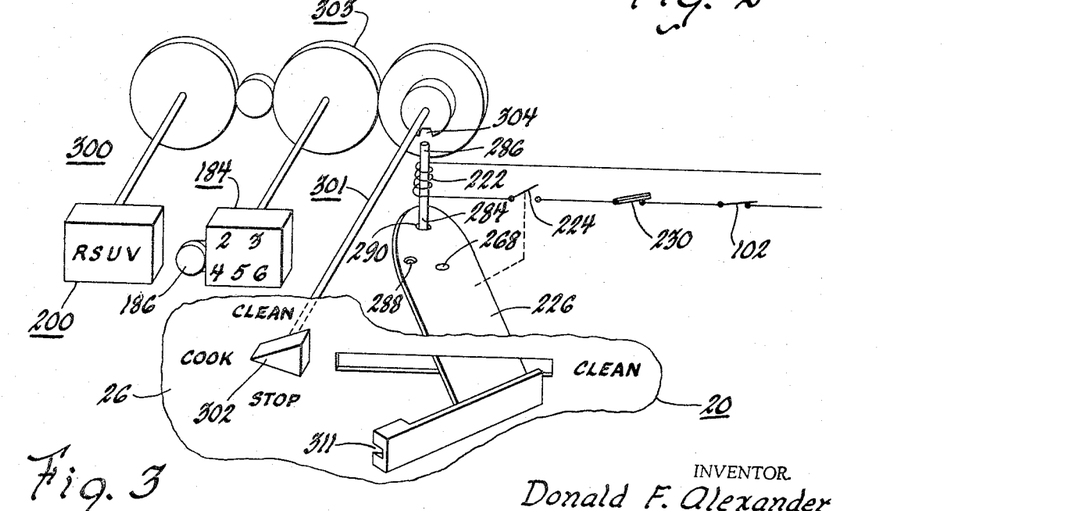
FIGURE 3 is a schematic representation of the control arrangement for the self-cleaning oven portion of this invention.

The interlock portions of the safety system of this invention will best be understood with a description of an operating cycle for the self-cleaning oven 50, reference being had to the schematic representation of FIGURE 3. The control means, referred to generally as 300 in FIGURE 3, includes the selector switch assembly 200, the clean timer assembly 184, the user settable control or clean timer knob means 301 connected as by a gear train 303 in a manner to interconnect the actuation of the switches in the clean timer 184 and the selector switch 200 whenever the clean timer knob 302 is rotated. Note that the clean timer knob is not free to rotate at all times. For instance, knob rotation is prevented during the movement of the latch arm 226 from its unlatched position during the first 10° of latch arm movement by the slot 311 which overfits a clean timer knob 302 and then during the next 80° of latch arm movement by a solenoid actuated clean timer lock pin 286 which inserts in a notch 304 of the clean timer knob means 301.

Assuming now that it is desired to initiate an oven cleaning cycle to remove the accumulated soil from the oven 50, the user will close the oven door 56 to move the door switch 102 in series with the lock solenoid 222 (FIGURE 6). In view of the sloppy fit of the latch lock pin 284 in oversized latch mechanism slot 288, the latch arm 226 is limitedly pivotally movable, and after a 10° movement thereof, the lock solenoid switch 224 is closed to energize the lock solenoid 222. This lifts the lock pin 284 out of the latch lock hole 288 so that the latch arm 226 may be pivoted an additional 80° about its fixed center, such as the pivot pin 268, until the latch lock hole 290 is shifted in line with the lock pin 284 and the latch handle is approximately in the door latched CLEAN position shown schematically in FIGURE 3. At this point, the switch 224 opens and the solenoid 222 is deenergized, thereby dropping the timer lock pin 286 out of the timer lock notch 304 and dropping the latch lock pin 284 into the oversized latch lock hole 290.

Once the latch arm 226 is in the position of FIGURE 3, the oven door is locked and the clean timer knob 302 may be manually rotated 90° from the COOK position to the CLEAN position. The interconnection of the gear train 303 effects the following operations as the clean timer knob is rotated. First and with reference to FIGURE 6, R and S transfer from the $R_1$ and $S_1$ position, respectively, to the $R_2$ and $S_2$ position thereby connecting the bake heating element for electrical energy through a pulser 210 and connecting the broil heating element 90 for energization on a 118-volt power supply, $L_2$, N. Switches 179 and 181 are closed by the manual rotation of the clean timer knob, respectively, on contacts U and V to set up the high temperature circuit and to shunt out the cooking operation thermostat 128. Clean timer motor switch 188, closed manually on clean timer contact 2, energizes the clean timer 184 for automatic termination of the oven cleaning operation. In response to timer knob rotation, timer switch 190 moves from cooking operation contact 4 to cleaning operation contact 3 to disconnect the oven thermostat 128 (switch W), and clean timer switch 192 moves from cooking operation contact 6 to cleaning operation contact 5 to start the cooling air blower 76. After this set up procedure, the clean timer motor 186 will advance the cleaning operation for about a two-hour period (between 116 minutes and 128 minutes depending on how close the timer knob is turned to the 90° CLEAN position). As will be apparent from FIGURES 5 and 6, heat may be supplied for cleaning only as long as contact 3 is closed. As soon as the timer actuates switch 190 to open contact 3, the primary 152 of the transformer is deenergized along with the low voltage circuit 156. Four minutes later, the timer switch 188 opens the contact 2 to terminate the operation of the clean timer 184. To illustrate the interconnection of the selector switch assembly 200 with the clean timer 184, FIGURES 4 and 5 have been coordinated so that the 60 incremental advances of the timer (FIGURE 5) start and stop coincidentally with the 0°–360° rotation of the selector switch.

As long as the temperatures within the oven chamber are above 500° F., the safety thermostat 230 will remain open to prevent the unlatching of the oven door and the lock light 228 will remain illuminated to indicate high temperatures in the oven. After the lock light 228 goes out, indicating a reclosing of the safety thermostat 230 due to cooling, the user is instructed to turn the clean timer knob 302 from the timer STOP position to the COOK position. This manual knob operation will cause transfer switches R and S to move from the cleaning operation contacts $R_2$ and $S_2$, respectively, to the cooking operation contacts $R_1$ and $S_1$ to reestablish cooking heat supply rates; will cause switches 179 and 181 to open contacts U and V, respectively, to reestablish cooking thermostat control; and will cause timer switch 192 to move from the cleaning operation contact 5 to the cooking operation contact 6 to condition the latch solenoid circuit for energization so that the oven door can be unlatched when oven temperatures permit. As soon as the latch arm 226 is returned to its unlatched position covering and interlocking with the clean timer knob 302, the range 20 is in condition for cooking operations, such as Cook and Warm or Brown and Tenderize.

*Control means—Cook and warm*

The Cook and Warm operation provided by the control means of FIGURE 6 is intended primarily for use with good cuts of meat which are properly aged for tenderness. In general, the meat is cooked for a preselected timed COOK period at high temperature and then retained for an indefinite WARM period at a lower temperature until it is removed from the oven for serving. A high temperature of 325° F., for example, has been determined as the most desirable single oven temperature at which the meat roast should be cooked, while a low holding temperature of 155° F., for example, in the oven is effective to keep the food suitably warm until the meat is ready to be served.

In operation and with reference to FIGURES 2 and 6, the following user instructions will be provided to set up a Cook and Warm operation. A cook book will be provided with the domestic range 20 to give the user a suggested HOURS TO COOK selection for a given size and type of roast. This selection is made by turning the knob 122 to the suggested number of cooking hours from zero to nine. For most roasts, this will be from two to four hours. Note, however, as mentioned in the section on Control Means—General, the 325° F. high temperature cook portion of the Cook and Warm operation will extend only for a given percentage of the selected time interval at which point, the temperature will automatically be decreased to the 155° F. warm setting (FIGURE 7). In the case of a three (3) hour HOURS TO COOK setting, for instance, a timed period of high heat (325° F.) will last for one and one-half (1½) hours before the oven temperature is decreased.

Simultaneously, with the selection of HOURS TO COOK by knob 22, the timer switch 115 will be positioned in engagement with up motor contact 116 to energize the thermostat up drive motor 139 from $L_1$, switch 115, up motor 139, printed circuit track 135a, driven bus bar 136 and printed circuit track 135e to the other side of the line N. The motor 139 will drive the bus bar 136, the oven temperature control rheostat 132 and the oven thermostat knob 130 until the bus bar reaches the upper end of the track 135a—a point which corresponds in rheostat 132 and the variable temperature markings 133 of the control knob to 325° F. At this point, the up motor 139 will be deenergized and the Cook portion of the Cook and Warm operation will be under way. After one and one-half (1½) hours, in the case of an HOURS TO COOK selection of three (3), the timer switch 115 is moved to the down motor contact 117 and the thermostat down drive motor 140 will be energized from $L_1$, switch 115, contact 117, down motor 140, printed circuit track 135b, bus bar 136 and printed circuit track 135e to the other side of the line N. The bus bar 136 will now be driven in the decreasing temperature direction until it reaches the lower end of the printed circuit track 135b at which point the down motor 140 will be deenergized. This point will correspond on the oven temperature control rheostat 132 and the variable temperature markings 133 of the control knob approximately to 155° F. During this warm portion of the Cook and Warm operation, the rheostat 132 will cooperate with the oven sensor 158 in the low voltage circuit 156 to effect a cycling control of the oven heating elements 90, 94 in series with each other and across L, N. In this regard, note that the oven thermostat switches Y and Z remain in the position shown in FIGURE 6 in all cases except when the oven thermostat knob 130 is set to the broil position 131. Note further that the bus bar 136 as it is being driven downwardly by the down motor 140, engages a printed circuit track 135c at a point which corresponds on the oven temperature control rheostat 132 and the variable temperature markings 133 approximately to 203° F. The bus bar continues to engage the track 135c as it reaches its lowest WARM temperature position (155° F.) at the lower end of circuit track 135b. This energizes a relay 310 from $L_1$, switch 192, timer contact 6, through relay 310, printed circuit track 135c, bus bar 136, and printed circuit track 135e to the other side of the line N. The relay 310 serves several purposes which enhance the low temperature operation in the Warm portion of the Cook and Warm operation. Included in the relay 310 is a relay switch 312 which is moved from the position shown to engage a contact 314 to shunt out the catalyst heater 112. This is desirable since the catalyst heater adds heat to the oven and makes it difficult to retain a closely controlled warm temperature in the oven, especially in view of the added insulation in an oven provided with the high temperature cleaning feature. The relay 310 also includes a relay switch 316 which moves from the position shown to a contact 318 for disconnecting the power supply cycling switch means 168 in the high voltage side of the line. Since this action cuts out the heater 164 for the normally open cycling switch 168, a heater 320 of the same resistance value is added to the circuit and energized by the relay switch 316 to maintain constant current to the anticipator heater 176. Thus, the energization of the relay 310 in the low temperature Warm setting of a Cook and Warm operation disconnects the catalyst heater 112 and also the power supply from 236 volt line L–2. The low temperature of approximately 155° F. is then retained in the oven by the cycling of the heating element 94 in series with the broil heating element 90 on 118 volts by the power supply cycling switch means 166 until the meat is ready to be served. Even though the relay 310 closes a switch 340 in series with the tenderizing rheostat 324, the user for Cook and Warm, will be instructed to leave the tenderizing control knob 326 in its OFF position 325 to avoid an increase of the low warming temperature of 155° F.

The Cook and Warm operation is terminated after the meat is removed from the oven by manually turning the oven thermostat knob 130 to the off position 129, during which time, the rheostat 132 will be returned to its maximum resistance position or to an open circuited position, the thermostat switch W will be opened, the bus bar 136 will be returned to the position shown in FIGURE 6 clutch 138 preventing the back driving of motors 139 and 140), and the relay 310 will be deenergized with the relay switches 312 and 316 returning to the positions shown in FIGURE 6. The thermostat transfer swtiches Y and Z will remain as shown in FIGURE 6.

*Control means—Brown and Tenderize*

Figure 8:
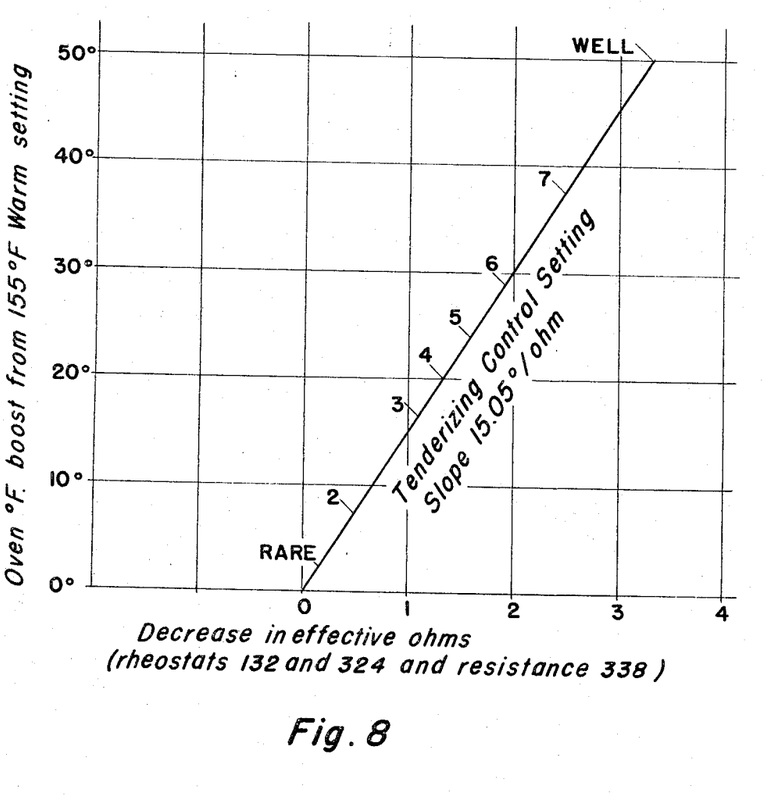
FIGURE 8 is a graph showing the effect of the tenderizing control on oven temperature.

A major concept of this invention is in that portion of the control means for providing a Brown and Tenderize operation is the tenderizing control 123. The control 123 includes a rheostat portion 324 which is variable to decrease resistance (increases oven temperature above the 155° F. low value determined by the printed circuit track 135b) as the tenderizing control knob 326 is rotated from a RARE position 328 clockwise in graduated steps to a WELL done position 330 (FIGURE 8). It should be understood that these graduated steps may be different for different domestic range constructions. For instance, in ranges not having the added insulation which accompanies the self-cleaning feature, the WELL done position may have to boost the low temperature in the oven even more to make up for the increased heat loss. Mechanical interconnections with the knob 326 close switches 332 and 334 as soon as the tenderizing control knob is turned from the OFF position. The switch 332 puts the rheostat 324 in the circuit and the switch 334 energizes a Brown and Tenderize indicator lamp 336 on the console of the range. A resistance 338 is included in series with the rheostat 324 to limit the amount of increase or boost in oven temperature which the manipulation of the knob 326 can achieve. With respect to dial markings 325, 328 and 330 and settings for the tenderizing control, the following charts are exemplary.

DIAL MARKINGS

| Tenderizing Control 123 | | Resistance Shunting Rheostat 132 | | | Change in Effective ohms, Rheostat 132=34.33 ohms | Oven, ° F. Boost |
| --- | --- | --- | --- | --- | --- | --- |
| Marking | Degs., CW | Rheostat 324 (ohms) | Resistance 338 (ohms) | Total, ohms | | |
| Rare | 40 | 6,600 | 300 | 6,900 | −.17 | 2.6 |
| 2 | 77.1 | 1,880 | 300 | 2,180 | −.53 | 8 |
| 3 | 114.2 | 728 | 300 | 1,028 | −1.11 | 16.7 |
| 4 | 151.3 | 563 | 300 | 863 | −1.312 | 19.8 |
| 5 | 188.4 | 422 | 300 | 722 | −1.558 | 23.5 |
| 6 | 225.5 | 280 | 300 | 580 | −1.92 | 28.9 |
| 7 | 262.6 | 136 | 300 | 436 | −2.50 | 37.6 |
| Well | 300 | 0 | 300 | 300 | −3.52 | 53.0 |

Rheostat 132=34-35 ohms at WARM temperature (155° F.).
Senser 158=15 ohms (senser and oven at room temperature).
  =68 ohms (oven at 900° F., senser at 900° F.).
  =42 ohms (oven at 500° F.; senser at 520° F.).
  =28.5-30.5 ohms (oven at 325° F.; senser at 350° F.).
  =20-22 ohms (oven at 155° F.; senser at 185° F.).

User instruction:
  NOTE.—Use the longer tenderizing operation on the tougher meats.

operation. This operation is intended for use with economy cuts of meat which can be tenderized if cooked at closely controlled preselected low temperatures for an extended time period of relatively indefinite duration. In distinguishing over the Cook and Warm operation described hereinabove, it can be said that the Cook and Warm operation includes a relatively long timed first period of high temperature wherein the meat is roasted and essentially totally cooked to the desired doneness followed by a second period of low temperature wherein the meat is retained at a serving temperature without further cooking until the meat is removed from the oven. On the other hand, the Brown and Tenderize operation includes a relatively short timed first period of high temperature for browning the roast and sealing the juices therein and a second period of closely controlled low oven temperatures during which the meat is cooked—the cooking temperature remaining so low that the meat is tenderized by the retention of all of the neutral juices of the meat therein. Briefly then, in Cook and Warm the meat is cooked at the end of the high temperature period; in Brown and Tenderize the meat is not cooked until the end of the low temperature period. For tough meats it is important that the internal temperature of the meat be brought up to temperature very slowly. The internal temperature of a beef roast, for instance, should not go above 160° F. for best tenderizing.

Of primary importance in the Brown and Tenderize

| | Hours to Cook, Setting | Tenderizer, Setting |
| --- | --- | --- |
| Eight (8) hour tenderizing operation: | | |
| 6 pound rolled rib beef roast (medium doneness) | 3¾ | 6½ |
| 3 pound center cut, loin end pork roast | 2½ | 7 |
| 10 pound rolled boneless ham, smoked | 4¼ | 7 |
| Fourteen (14) hour tenderizing operation: | | |
| 6 pound chuck roast of beef, bone in | 1 | 7 |
| 3 pound center cut, loin end pork roast | 1 | 6 |
| 14 pound whole, uncooked ham, bone in | 2 | 6 |

In operation, through a cook book provided with the range and of which the above chart is exemplary, the user is instructed to select a time period for the browning portion of the Brown and Tenderize operation in accordance with the size and type of meat being cooked. In most instances this will be a setting of approximately one hour on the knob 122, which, as described hereinabove, will provide a thirty-minute high temperature browning interval before the temperature is reduced by the motorized thermostat down motor 140 to the low temperature setting as modified by the manual tenderizing selection on the tenderizing control rheostat 324. More particularly, the clock controlled timer switch 115 will be moved to the contact 116 as soon as the knob 122 is moved from the MANUAL position and the up motor 139 will be energized to drive the bus bar 136 and the rheostat 132 to the high temperature browning setting of 325° F.—the up motor being deenergized when the bus bar 136 reaches the upper end of the printed circuit track 135a. After the relatively short timed browning period has elapsed, the clock timer 120 will cause the switch 115 to move to its contact 117 to energize the down motor 140 for driving the temperature control rheostat 132 to its low temperature setting of 155° F.—this point corresponding to a bus bar position at the lower end of the printed circuit track 135b. Note that the relay 310 will be energized through the printed circuit track 135c when the bus bar 136 is in its low temperature position, thereby to close a relay switch 340 in series with the tenderizing control rheostat 324 and to connect this rheostat in the circuit to boost the normal low temperature of 155° F. a predetermined amount in accordance with the selection on the tenderizer control knob 326. The rheostat 324 is designed to provide a temperature increase in the oven to any temperature within the temperature span from 155° F. to 215° F. Note, however, that this is an *oven* temperature setting. The internal meat temperature is below the oven temperature and will vary from about 145° F. to 160° F., depending on the low temperature tenderizing selection made on the rheostat 324. As in the Cook and Warm operation the relay 310 will cut out the catalyst heater 112 with the relay switch 312 and, with relay switch 316, will change the power supply for the oven heating elements 90, 94 from high voltage to low voltage and connect the heating elements 90, 94 in series with each other. The selected low temperature tenderizing operation will then continue for an indefinite period until the meat is removed from the oven at the time of serving and the oven thermostat knob 130 is turned to OFF position 129.

During the oven operations of CLEAN, Cook and Warm, and Brown and Tenderize, a 236-volt neon oven cycling lamp 344 operates to indicate energization of the oven heating elements 90 and 94. During high power 3600-watt oven cooking operations, the cycling lamp 344 will glow brightly when the oven heating elements 90 and 94 are ON (lamp across 236 volts wtih cycling switch 168 closed) and will glow dimly when the oven heating elements are OFF (lamp across 118 volts with cycling switch 168 open). During low power 300-watt oven cooking operations, the oven cycling lamp 344 will be off when the oven heating elements 90 and 94 are ON and will glow dimly when the oven heating elements are OFF (lamp across 118 volts). During CLEAN, the cycling lamp does not normally operate since the clean lamp 193 and lock lamp 228 serve as operating indicators while the oven is being cleaned.

While the embodiment of the present invention as herein disclosed constitutes a preferred form, it is to be understood that other forms might be adopted.

What is claimed is as follows:

1. In combination with an oven having first heating means for heating in said oven and second heating means for eliminating smoke from said oven, low temperature roasting control means for controlling said first heating means in sequential cooking and warming or browning and tenderizing operations, said control means including
   (a) high and low voltage power supply means in cycling control relationship to said first heating means,
   (b) high temperature control means settable in one manner to effect the cycling of said first heating means through said high and low voltage power supply means in the cooking and browning portions of said operations at a high temperature in said oven,
   (c) said high temperature control means settable in another manner to effect the cycling of said first heating means through said high and low voltage power supply means in the warming and tenderizing portions of said operations at a low temperature in said oven,
   (d) low temperature control means settable to effect the cycling of said first heating means through said high and low voltage power supply means in said tenderizing portion of said browning and tenderizing operation and variable to adjust accurately the value of said low temperature in said oven,
   (e) timer operated means for sequentially placing first said high temperature control means in effective cycling control relationship with said first heating means for a short period of high temperature during which meat is adapted to be browned and then placing said low temperature control means in effective cycling control relationship with said heating means for a long period of low temperature during which meat is adapted to be tenderized,
   (f) said timer operated means controlling said high and low voltage power supply means to supply only low voltage power to said first heating means when said low temperature control means is in effective cycling control relationship with said first heating means,
   (g) said timer operated means controlling said second heating means to negate its effectiveness for eliminating smoke from said oven when said low temperature control means is in effective cycling control relationship with said first heating means,
   (h) and user operable means connected to said low temperature control means for setting said low temperature control means to vary the low temperature in said oven in accordance with the desired doneness to be achieved during said tenderizing.

2. The combination of claim 1 including timer operated motorized means for setting said high temperature control means first in said one manner and then in said another manner.

3. The combination of claim 1 wherein said control means includes for an oven cleaning operation a cleaning temperature control means in shunt relationship to said high temperature control means and operable during said cleaning operation to effect the cycling of said first heating means through said high and low voltage power supply means at a cleaning temperature above said high temperature.

4. In combination with an oven having first heating means for heating in said oven and second heating means for eliminating smoke from said oven, low temperature roasting control means for controlling said first heating means in sequential browning and tenderizing operations, said control means including
   (a) high and low voltage power supply means in cycling control relationship to said first heating means,
   (b) high temperature control means presettable to effect the cycling of said first heating means through said high and low voltage power supply means in said browning operation at a high temperature in said oven,
   (c) low temperature control means presettable to effect the cycling of said first heating means through said high and low voltage power supply means in said tenderizing operation at a low temperature in said oven and variable to adjust accurately the value of said low temperature in said oven,
   (d) timer operated means for sequentially placing first said high temperature control means in effective cycling control relationship with said first heating means for a short period of high temperatuure during which meat is adapted to be browned and then placing said low temperature control means in effective cycling control relationship with said first heating means for a short period of high temperature during which meat is adapted to be tenderized,
   (e) said timer operated means controlling said high and low voltage power supply means to supply only low voltage power to said first heating means when said other of said high and low temperature control means is in effective cycling control relationship with said first heating means, (f) said timer operated means controlling said second heating means to negate its effectiveness for eliminating smoke from said oven when said other of said high and low temperature control means is in effective cycling control relationship with said first heating means, (g) and user operable means connected to said low temperature control means for setting said low temperature control means to vary the low temperature in said oven in accordance with the desired doneness to be achieved during said tenderizing.

5. In combination with an oven having heating means for heating in said oven, low temperature roasting control means for controlling said heating means in sequential high and low temperature operations, said control means including (a) high and low voltage power supply means in cycling control relationship to said heating means, (b) high temperature control means settable to effect the cycling of said heating means through said power supply means in said high temperature operation at at high temperature in said oven, (c) low temperature control means settable to effect the cycling of said heating means through said high and low voltage power supply means in said low temperature operation at a low temperature in said oven and variable to adjust accurately the value of said low temperature in said oven, (d) timer operated means for sequentially placing first said high temperature control means in effective cycling control relationship with said heating means for a short period of high temperature during which meat is adapted to be browned and then placing said low temperature control means in effective cycling control relationship with said heating means for a long period of low temperature during which meat is adapted to be tenderized, (e) said timer operated means controlling said high and low voltage power supply means to supply only low voltage power to said heating means when said other of said high and low temperature control means is in effective cycling control relationship with said heating means, (f) and user operable means connected to said low temperature control means for precisely adjusting said low temperature control means for an accurately calibrated low temperature in said oven.

6. In combination with an oven having heating means adapted for heating in said oven in a low temperature meat roasting circuit, low temperature roasting control means for controlling said heating means in sequential high and low temperature operations, said control means including (a) power supply means in cycling control relationship to said heating means, (b) high temperature control means settable to effect the cycling of said heating means through said power supply means in said high temperature operation at a high temperature in said oven, (c) low temperature control means settable to effect the cycling of said heating means through said power supply means in said low temperature operation at a low temperature in said oven and variable to adjust accurately the value of said low temperature in said oven, (d) timer operated means for sequentially placing said high temperature control means in effective cycling control relationship with said heating means for a short period of high temperature during which meat is adapted to be browned and then placing said low temperature control means in effective cycling control relationship with said heating means for a long period of low temperature during which meat is adapted to be tenderized, (e) and user operable means connected to said low temperature control means for precisely adjusting said low temperature control means for an accurately calibrated low temperature in said oven.

7. The combination of claim 6 wherein said user operable means is user adjustable in accordance with the particular type and weight of meat being roasted to provide a desired doneness.

8. In combination with an oven having heating means, control means in energy supply control relationship to said heating means in a low temperature meat roasting circuit, said control means including first means presettable to cycle said heating means at a fixed predetermined low temperature in said oven and adjustable to respond accurately to low temperatures in said oven, said control means including second means presettable to cycle said heating means at a fixed predetermined high temperature in said oven, timing means for selectively placing said second means in control relationship with said heating means for a short period of high temperature during which meat is adapted to be browned and then placing said first means in effective cycling control relationship with said heating means for a long period of low temperature during which meat is adapted to be tenderized, and user operable means for substantially infinitely adjusting said first means within predetermined limits in accordance with the desired doneness for the meat being roasted.

9. In combination with an oven, a control for oven heating means in a low temperature roasting circuit comprising, first cyling switch means in series with said heating means, said first cycling switch means including means presettable to effect the cycling of said heating means at a predetermined low temperature in said oven and user adjustable to respond accurately to a desired low temperature in said oven in accordance with a desired doneness, second cycling switch means in series with said heating means, said second cycling switch means including means presettable to effect the cycling of said heating means at a predetermined high temperature in said oven and adjustable to respond accurately to a high temperature in said oven, power driven means operable for adjusting the high temperature presettable means, and timing means for operating said power driven means to selectively place one of said presettable means in effective cycling control relationship with said heating means.

10. In combination with a range having a plurality of means operable for effecting different cooking functions, a thermostat driveable for selectively predetermining a control temperature for said different cooking functions, printed circuit means having track means connected selectively in operative relationship to said plurality of means, and motorized means in circuit closing relationship with said track means for selectively operating said plurality of means to effect a particular cooking function and in driving relationship with said thermostat for predetermining a control temperature in accordance with the particular cooking functions effected.

11. The combination of claim 10 wherein said plurality of means includes a high and low voltage power supply means.

12. In a system for association with a source of energy of variable voltage for controlling a heater in accordance with a sensed temperature, the combination of resistive means having a high temperature coefficient of resistance for sensing temperature, self-interrupting thermal relay means having a cycler switch and a heater winding, means for connecting said heater winding, said resistive means and said cycler switch across the source, a control relay having an energizing winding, means including said control relay for controlling said heater, means for connecting said energizing winding in parallel with said resistive means and heater winding and in series with said cycler switch, and rheostat means in series with said heater winding for calibrating said combination to control the operation of said cycler switch.

13. In a domestic range having a heater and a concealed system for association with a source of energy of variable voltage for controlling said heater in accordance with a sensed temperature, the combination of resistive means having a high temperature coefficient of resistance for sensing temperature, self-interrupting thermal relay means having a cycler switch and a heater winding, means for connecting said heater winding, said resistive means and said cycler switch across the source, a control relay having an energizing winding, means including said control relay for controlling said heater, and means for connecting said energizing winding in parallel with said resistive means and heater winding and in series with said cycler switch, and rheostat means in series with said heater winding for calibrating said combination to control the operation of said cycler switch, said rheostat means being remote from said system and in an easily accessible location on said range.

14. In combination with an oven, a control for oven heating means in a low temperature roasting circuit comprising, first cycling switch means in series with said heating means, said first cycling switch means including means presettable to effect the cycling of said heating means at a predetermined low temperature in said oven and user adjustable to respond accurately to a desired low temperature in said oven, second cycling switch means in series with said heating means, said second cycling switch means including means presettable to effect the cycling of said heating means at a predetermined high temperature in said oven and adjustable to respond accurately to a high temperature in said oven, timing means for selectively placing one of said presettable means in cycling control relationship with said heating means, manually operated means for adjusting the low temperature presettable means, and power driven means for adjusting the high temperature presettable means.

15. For use with an oven having heating means controllable for effecting sequential periods of high and low temperature, an automatic control including first means adapted to be in energy supply control relationship to said heating means for effecting a controlled high temperature period, second means adapted to be in energy supply control relationship to said heating means and adjustable for effecting a controlled low temperature period, timing means for selecting one of said first and second means, and means operable when said second means is selected for reducing the rate of energy supply thereby to effect a closer control of the low temperature, said first means including a high energy cycling means and a high temperature adjuster, and said second means including a low energy cycling means and a low temperature adjuster.

16. For use with an oven having heating means controllable for effecting sequential periods of high and low temperature, an automatic control including first means adapted to be in energy supply control relationship to said heating means for effecting a controlled high temperature period, second means adapted to be in energy supply control relationship to said heating means and adjustable for effecting a controlled low temperature period, timing means for selecting one of said first and second means, and means operable when said second means is selected for reducing the rate of energy supply thereby to effect a closer control of the low temperature, said first means including a high energy cycling means and a high temperature adjuster, and said second means including a low energy cycling means and a low temperature adjuster, said high temperature adjuster being motorized and said low temperature adjuster being manually user adjustable for closely determining said low temperature.

17. For use with an oven having heating means controllable for effecting sequential meat browning and tenderizing periods respectively of high and then low temperature, an automatic low temperature roasting control including thermostatic means adapted to be in energy supply control relationship to said heating means and adjustable upwardly for effecting a controlled high temperature meat browning period and adjustable downwardly for terminating said high temperature meat browning period, means adapted to be in effective energy supply control relationship to said heating means when said thermostatic means is adjusted downwardly for effecting a controlled low temperature meat tenderizing period, power driven means operable for adjusting said thermostatic means downwardly, timing means for operating said power driven means, and user operated means for adjusting said means for effecting a controlled low temperature in accordance with the meat doneness desired by said user during said meat tenderizing period.

18. For use with an oven having heating means controllable for effecting sequential meat browning and tenderizing periods respectively of high and then low temperature, an automatic low temperature roasting control including thermostatic means adapted to be in energy supply control relationship to said heating means and adjustable in one manner for effecting a controlled high temperature meat browning period and adjustable in another manner for terminating said high temperature meat browning period, means adapted to be in effective energy supply control relationship to said heating means when said thermostatic means is adjusted in said another manner for effecting a controlled low temperature meat tenderizing period, power driven means operable for adjusting said thermostatic means in said another manner, timing means for operating said power driven means, and user operated means for adjusting said means for effecting a controlled low temperature in accordance with the meat doneness desired by said user during said meat tenderizing period.

References Cited
UNITED STATES PATENTS

| | | | |
|---|---|---|---|
| 2,688,679 | 9/1954 | Schleuning | 338—194 X |
| 2,828,399 | 3/1958 | Fry | 219—398 X |
| 3,032,636 | 5/1962 | Schaver | 219—413 |
| 3,051,814 | 8/1962 | Bergsma | 219—492 X |
| 3,121,158 | 2/1964 | Hurko | 219—397 |
| 3,221,142 | 11/1965 | Kamide | 219—413 |
| 3,251,980 | 5/1966 | Miles | 219—511 X |

RICHARD M. WOOD, *Primary Examiner.*

C. L. ALBRITTON, *Assistant Examiner.*

UNITED STATES PATENT OFFICE
CERTIFICATE OF CORRECTION

Patent No. 3,353,004                                        November 14, 1967

Donald F. Alexander

It is hereby certified that error appears in the above numbered patent requiring correction and that the said Letters Patent should read as corrected below.

Column 3, line 42, for "oven linear" read -- oven liner --; column 4, line 13, for "interview" read -- interval --; line 47, for "mvoed" read -- moved --; column 7, lines 9 and 10, for "swich", each occurrence, read -- switch --; column 8, line 5, for "a neon" read -- a Neon --; column 11, line 1, before "heating" insert -- bake --; line 16, for "clutch 138" read -- (clutch 138 --; column 13, line 38, for "neon" read -- Neon --; line 43, for "wtih" read -- with --; column 14, line 70, for "for a short period of high temperature" read -- for a long period of low temperature --; column 15, line 24, for "at high" read -- a high --.

Signed and sealed this 15th day of April 1969.

(SEAL)
Attest:

EDWARD M. FLETCHER, JR.                            EDWARD J. BRENNER
Attesting Officer                                        Commissioner of Patents